UNITED STATES PATENT OFFICE.

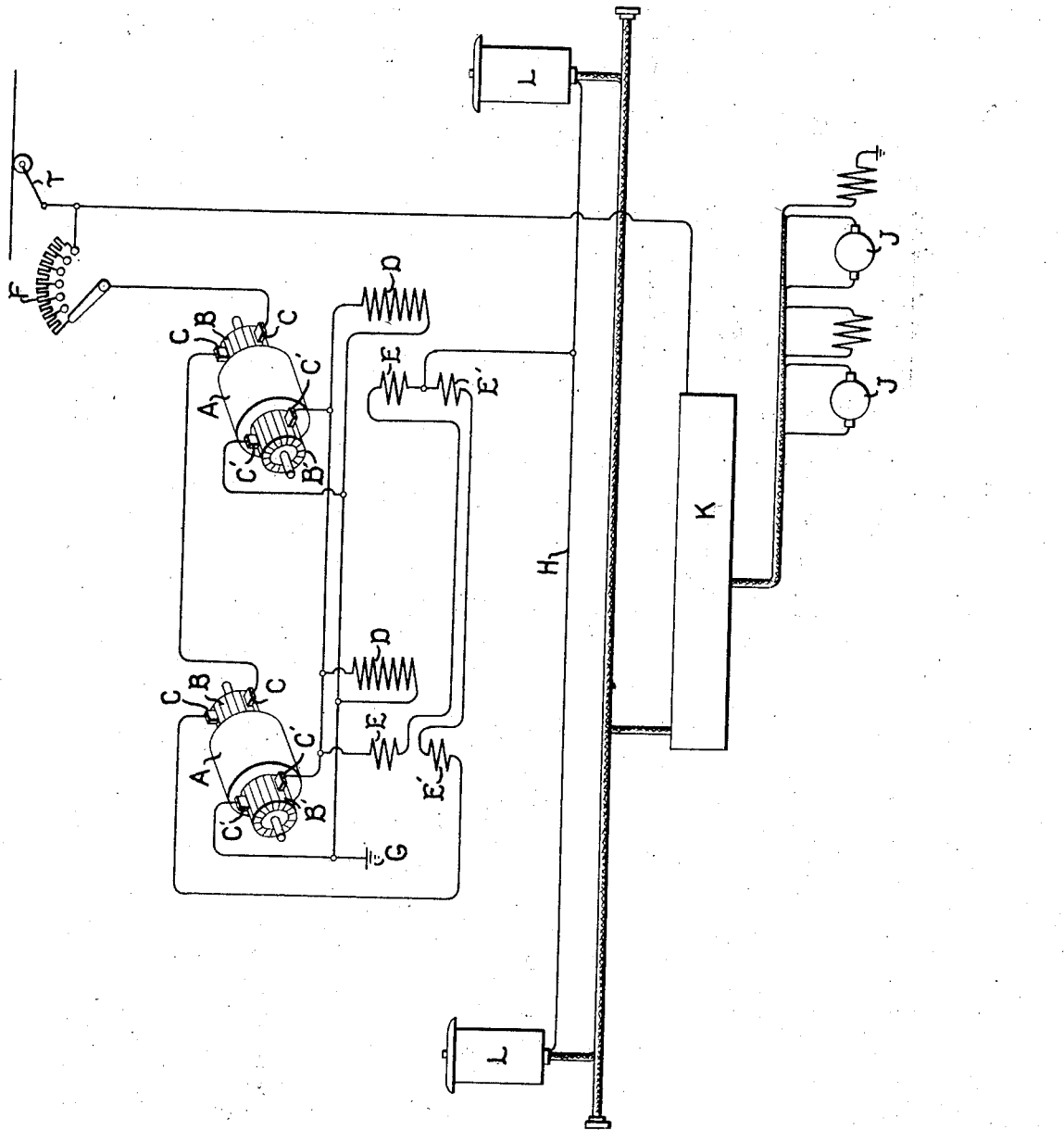

MAX R. HANNA, OF SCHENECTADY, NEW YORK, ASSIGNOR TO GENERAL ELECTRIC COMPANY, A CORPORATION OF NEW YORK.

VOLTAGE TRANSFORMATION.

1,026,391.  Specification of Letters Patent.   Patented May 14, 1912.

Application filed November 23, 1911. Serial No. 661,954.

*To all whom it may concern:*

Be it known that I, MAX R. HANNA, a citizen of the United States, residing at Schenectady, county of Schenectady, State of New York, have invented certain new and useful Improvements in Voltage Transformation, of which the following is a specification.

My invention relates to a system for transforming direct current from one voltage to another. In such a system, direct current rotary transformers are employed, which comprise two armature windings provided with commutators. The two armature windings may both be placed on the same armature core and have a single field magnet in common, in which case the rotary transformer is technically known as a dynamotor, or they may be placed on separate armature cores and have separate field magnets, in which case the rotary transformer is known as a motor generator. Such direct current rotary transformers are finding a useful application in connection with high voltage direct current car equipments in which it is desirable to supply the controlling devices and the lights with a lower voltage than that employed for the motor circuits.

My invention has for its object to provide a system for transforming the voltage of a supply circuit operating at a higher voltage than can be taken care of by a single rotary transformer and comprises a plurality of rotary transformers having their windings connected in a novel manner so as to divide the voltage of the supply circuit between them and to supply a low voltage to a load circuit to which the controlling devices and lights are connected.

My invention will best be understood by reference to the following description taken in connection with the accompanying drawing, in which the single figure shows diagrammatically a system arranged in accordance with my invention.

In the drawing, A, A are the armatures of two rotary transformers, which I have preferred to illustrate as dynamotors. Each armature is provided with two windings, provided with commutators B, B' on which bear the commutator brushes C, C' respectively. The armature windings provided with commutators B' are connected in parallel to supply the low voltage load circuit, and the armature windings provided with commutators B are connected in series with each other and in series with the other armature windings connected in parallel, all being connected across a high voltage supply circuit.

D, D represent shunt windings which supply the excitation of the machines during normal operation. Each machine has series field windings E and E' which oppose and neutralize each other during normal operation.

F represents a starting rheostat.

The supply circuit extends from trolley T through rheostat F, armature windings connected to commutators B, which act as motor windings, in series, field windings E' in series, both series field windings E in series, and armature windings connected to commutators B' in parallel to ground G. The load circuit is connected between conductor H and ground, that is, across the terminals of the armature windings connected to commutators B'; which act as generator windings, in parallel and series field windings E in series. Conductor H is connected to the junction of the series field windings E with the series field windings E'. The shunt field windings are also connected across the load circuit and since one side is connected to ground, they need be insulated only for a low voltage.

J represents the driving motors for the vehicle, which are connected to the trolley through contactors (not shown) placed in the contactor box K. These contactors are controlled by the master-controllers L, which are connected to the conductor H. The windings of these contactors and of whatever other control devices there are on the vehicle, and the lights in the vehicle, form the load of the dynamotors.

By connecting the motor windings of the dynamotors in series, each winding has the same amount of current flowing through it, and consequently they tend to divide the load equally between them. By connecting the generator windings in parallel, the voltage delivered by each winding is the same, and they necessarily rotate at the same speed. If the supply circuit voltage is 1800, each of the armatures is designed for 600 volts, so that the two motor windings have 1200 volts across them in series, the other 600 volts being taken care of by the generator windings which supply power to the load circuit. If the supply circuit voltage is 2400, each of the motor windings is designed for 900 volts, so that the two in series have 1800 volts across them and the generator windings, in parallel, supply 600 volts to the load circuit. Of course, the supply voltage in any case may be divided up as desired, the armature windings being designed accordingly. The interconnection of the supply and load circuits is particularly advantageous because it results in producing a low voltage across the terminals of each armature winding.

The dynamotors may be started as compound wound motors by means of the starting rheostat F, the current flowing through the supply circuit which has been traced above and which includes all of the series field windings E and E' in series. Under these conditions these windings assist each other to magnetize the field magnet and prevent an excessive flow of current through the machines. When the dynamotors are up to speed and they are loaded, the direction of the current in field windings E is reversed, thus neutralizing the effect of field windings E'. The dynamotors thus act as shunt machines when under load. If the trolley leaves the wire during operation, the dynamotors act as generators because of their momentum and supply current to the driving motors J. This current flows through all the series field windings in series, its direction being reversed in the series field windings E', so that the magnetization produced by the windings E' and E is opposed to that produced by the shunt windings D. The field excitation is thus reduced and a heavy rush of current from the dynamotors is prevented.

I desire it to be understood that my invention is not limited to the particular arrangement of parts shown and described, and I aim in the appended claims to cover all modifications which do not depart from the spirit and scope of my invention.

What I claim as new and desire to secure by Letters Patent of the United States, is,—

1. In combination, a high voltage supply circuit, a low voltage load circuit, and a plurality of direct current rotary transformers, each having a motor winding and a generator winding, said generator windings being connected in parallel across said load circuit, said motor windings being connected in series with each other and in series with said generator windings in parallel, across said supply circuit.

2. In combination, a high voltage circuit, a low voltage circuit, and two direct current rotary transformers, each having two armature windings provided with commutators, one armature winding of one rotary transformer being connected in parallel with an armature winding of the other rotary transformer across said low voltage circuit, the other armature windings being connected, in series with each other and in series with said windings in parallel, across said high voltage circuit.

3. In combination, a supply circuit, a load circuit, and two direct current rotary transformers, each having a motor armature winding, a generator armature winding, a field winding supplying the normal excitation of the transformer and two series field windings, said generator armature windings being connected in parallel and in series with one series field winding of each rotary transformer across the load circuit, said motor windings being connected, in series with each other, the other series field windings in series, the first mentioned series field windings in series and in series with the generator armature windings in parallel, across said supply circuit, said series field windings of each rotary transformer normally opposing and neutralizing each other.

In witness whereof, I have hereunto set my hand this 21st day of November, 1911.

MAX R. HANNA.

Witnesses:
BENJAMIN B. HULL,
HELEN ORFORD.